May 24, 1966    J. DE KONING ETAL    3,252,574
METHOD OF AND APPARATUS FOR SEPARATING PARTICLES OF
DIFFERENT SPECIFIC GRAVITY IN A JIG
Filed Nov. 27, 1961                                 2 Sheets-Sheet 1

Inventors
Jacob De Koning
Machiel Bosman
By Cushman, Darby & Cushman
Attorneys

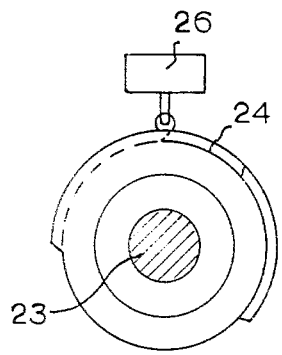
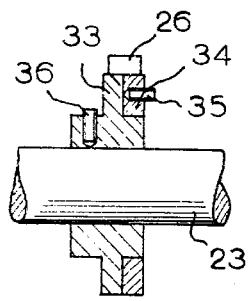
FIG. 4   FIG. 5
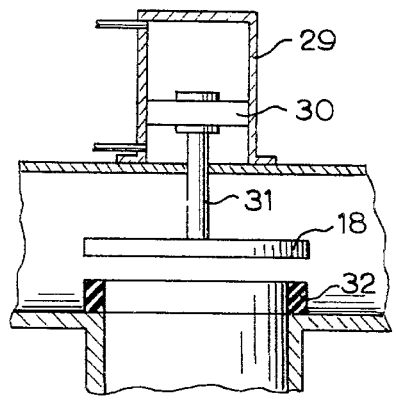
FIG. 6

United States Patent Office 3,252,574
Patented May 24, 1966

3,252,574
METHOD OF AND APPARATUS FOR SEPARATING PARTICLES OF DIFFERENT SPECIFIC GRAVITY IN A JIG
Jacob de Koning, Geleen, and Machiel Bosman, Beek, Netherlands, assignors to Stamicarbon N.V., Heerlen, Netherlands
Filed Nov. 27, 1961, Ser. No. 155,060
Claims priority, application Netherlands, Nov. 26, 1960, 258,454
13 Claims. (Cl. 209—457)

This invention relates to the separation of particles of different specific gravity in a jig, wherein pulsation of the separation liquid is obtained by varying the air-pressure in a compartment communicating with the jig. The material to be separated is washed over a screen immersed in the liquid on which it is separated under the influence of the pulsation into a lower layer, mainly composed of particles having a high specific gravity, and an upper layer mainly composed of particles having a lower specific gravity.

In separation of material, a satisfactory separation is obtained only after a number of pulsations. When the upward velocity of the liquid at the start of the upward stroke is low, the fine particles of high specific gravity already separated during a preceding stroke are carried upwards before the coarse particles of low specific gravity are lifted. Consequently, the separation effected by the preceding jig stroke is partly destroyed. To obtain a good separation with a small number of pulsations, it is essential that during the initial stage of the jig stroke the separation liquid should be forced upwards through the jig screen at such a velocity that all the particles will be lifted almost simultaneously. Subsequently, the liquid will, for a given length of time, not flow in vertical direction, or if so, only at a very slow rate, with the result that the particles drop down upon the screen again—the particles of high specific gravity first, and the particles of lower specific gravity afterwards. In such a prior art process, not only the velocity of fall of the particles in the liquid plays a part, but also the fact that the mixture of liquid and solid particles behaves as a dense medium in which the particles of lower specific gravity tend to arrange themselves over the particles of higher specific gravity. After the particles have settled, the liquid also flows back again.

In prior art of this character, the air is admitted by a rotary valve to a compartment communicating with the adjacent separation compartment. The desired variation in the velocity of the separation liquid in the separation compartment is obtained by adjusting the area of the inlet and outlet ports of the valve. The initial acceleration of the liquid is comparatively low, on the one hand because both the liquid in the separation compartment and the liquid in the air compartment have to be accelerated upon each stroke, and, on the other hand because in the application of rotary valves, the air inlet is opened only gradually. As a result, the mass to be accelerated is too large and the power available at the start of the stroke too weak to give the jig bed such an impulse as to enable it to be lifted as a whole. Also, owing to the position of the air chamber adjacent to the separation compartment, the upward current through the screen is more powerful in areas close to the air changer than in the more remote areas. Consequently, too weak an upward liquid current will be produced during the initial stage of the pulsation stroke, which partly eliminates the effect of the preceding stroke and is not equally distributed over the width of the jig.

It is a well-known procedure to produce pulsations in a jig by supplying and discharging compressed air through controllable valves to and from air-chambers under the screen. Pulsation in these machines, however, is not controlled in such a way that the particles to be separated are lifted quickly and substantially simultaneously at the start of the pulsation stroke.

The present invention provides a new and improved method of separating particles of different specific gravities, wherein the whole bed on the screen is lifted abruptly over the entire surface at the start of the upward stroke.

According to this invention, a compressive surge is produced in air-chambers under the screen by suddenly making these air-chambers communicate freely with a space in which a higher pressure prevails. Such a compressive surge is produced, when a closure member in the connecting line between the air-chamber and the room in which a higher pressure prevails, is fully opened within a time $$t = \frac{3L}{V}$$

where L represents the distance in meters between the air-chambers and the closure member and V the velocity of propagation in m./sec. of a shock wave produced by quickly opening the closure member.

A pressure wave possesses the property that, upon reflection against a closed wall, it exercises a pressure against that wall which is higher than the pressure behind the pressure wave. A pressure wave travelling through a cylindrical tube in which a pressure $p$ prevails produces upon reflection against a flat closure member in the tube, a pressure $p+2\Delta p$ when the pressure behind the approaching wave is $p+\Delta p$. Depending on the shape of the feed line and the machine, the pressure may be distributed in the sense that the pressure increase produced by reflection is smaller. The effect remains, however, that the liquid in the machine is abruptly accelerated by reflection of a pressure wave, which over-pressure amounts to some tens of precents of the pressure in the pressure space. The compressive surge which propagates through the liquid and leads the liquid current proper initiates the acceleration of the jig bed. On the one hand the bed is compacted so that it can more easily be lifted as a whole by the following liquid current, while on the other hand the bed has already been slightly lifted by the pressure wave, so that the oncoming liquid will meet the bed not only at the location of the screen apertures but act directly on the whole bottom area of the bed immediately over the screen. The desired effect is in most cases brought about by fully opening the closure member within 50 milliseconds.

Since the air-chambers are mounted directly below the screen, the amount of liquid separation medium to be accelerated is a minimum and the distance to be covered by the liquid is about equal in all places. The collective result is that the bed on the screen is lifted very quickly and evenly, so that the separation is already completed after a few pulsations. As a result the machine can either be loaded more heavily, or if the load is kept constant, the machine can be made smaller. Further, air consumption is lower than in the prior art compressed-air operated jigs.

Still further according to this invention, there is provided an apparatus for separating materials of different specific gravity of the character described, wherein the closure member between the air-chambers under the screen and the space containing the compressed air is a valve with a flat seat, the valve being mounted on the rod of a piston moving in a cylinder, and the supply and discharge of the operating medium in the cylinder being controlled by a distributing member which is operated by a cam mounted on a shaft. Such a valve need only be slightly lifted to allow provision of an ample passage along the circumference of the valve body. Moreover, the mass to be accelerated for opening the valve is small, since this mass is only composed of a flat disc valve, a piston rod, and a piston, which can be of a relatively light design. When rotary or slide valves are used, these valves, when closed, must amply overlap the outlet ports to give the required sealing which involves large dimensions and consequently larger masses to be accelerated.

Another object of this invention is to provide control means for the distributing member of the separator which includes a coil incorporated in an electric circuit which includes a switch operated by a cam and cam shaft, the construction contains practically no turning points which are liable to wear. As a result, the valve can be opened and closed much more quickly than in cases where use is made of levers and the like. An added advantage is that the controlling part of the piloting device, i.e., the camshaft and switches, can be accommodated at a site remote from the machine, for instance, in a central control room, and only the air valves with the cylinders to operate them have to be provided near the machines.

Still further according to this invention, adjustment of the frequency of the jig stroke is preferably done by continuous control of the number of revolutions of the camshaft. The amplitude of the pulsations can be controlled by lengthening or shortening the time during which the air valve is in the open position. For this purpose the cams are adjustably mounted on the cam-shaft and composed of two cam-discs that can be adjusted relative to each other. In order that the admission and discharge periods can be adjusted independently of each other the air-chambers are provided with separate admission and exhaust valves, each being operated, by the cam-shaft. This arrangement renders possible a choice of the most suitable cycle for any product and load. In the prior art, a change of the period automatically brings about a change of the exhaust period. The exhaust valve may be of the same design as the inlet valve. Here, too, quick opening of the valve is desirable for enabling the water to be quickly returned, thus giving a gain in time for the next stroke.

Advantageously, quick-action switches are used, as these can be relied upon to open the valves at exactly the right moment. With the present invention, the washing process can be accurately recorded, since opening and closing of the valves is unequivocably determined by the position of the cams and is not affected by retardation caused by fouled slide contacts, play in eye joints, and inertia of large masses to be set in motion. The washing process can now also be controlled simply by adjusting the cams.

These and still further objects, novel features, and advantages of the present invention will become apparent in the specification and claims, taken with the accompanying drawings.

In the drawings:

FIGURE 4 is a cross-section view of the camshaft;

FIGURE 5 is a longitudinal cross-section view of a cam; and,

FIGURE 6 is a vertical cross-section of an air valve assembly.

Figure 1:
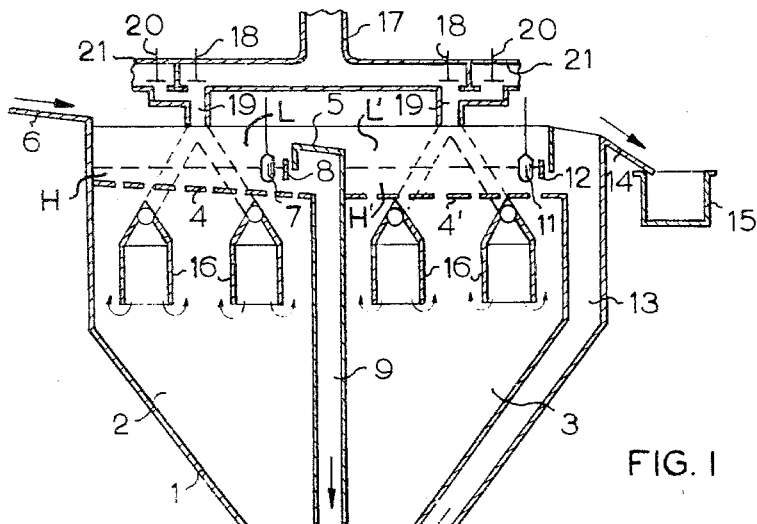
FIGURE 1 is a vertical cross-section view of a jig.

Referring now to the drawings, there is shown a jig 1 divided into two compartments 2 and 3 and bounded on their upper sides by top screens 4 and 4', and which are separated by a central bridge plate 5. A chute 6 is positioned above the screen 4 for receiving the material to be separated, e.g., raw coal, which is thereby fed into the compartment 2.

By virtue of the pulsations of medium in this compartment 2, as will become apparent, the feed is separated into a lower layer H containing the particles of the feed material having a high specific gravity, e.g., shale, and an upper layer L of particles having a low specific gravity, e.g., coal and middlings. The material having a high specific gravity (as shale) passes under a gate 8 positioned adjacent the central bridge plate 5. The gate 8 is operated by a float 7 and is in communication with a vertical conduit 9 disposed centrally within the jig 1 and having a bottom discharge opening. Joined to the bottom of the jig 1 is a bucket elevator 10 for removing the shale exhausted from the conduit 9.

The lighter coals and middlings pass over the central bridge plate 5 and onto the screen 4' which is over the compartment 3. Here they are separated into a lower layer H' consisting of middlings of a higher specific gravity and an upper layer L' containing the clean coal. There is provided a gate 12 operated by a float 11 identical in construction to the float operated gate 8.

A discharge conduit 13 is in communication with the gate 12 so that the middlings are carried off under the gate 12, delivered to the discharge conduit 13, and removed by a bucket elevator.

In FIGURE 1, the bucket elevator 10 is operatively positioned at the bottom of the jig 1 to discharge both the shale from the conduit 9 and the middlings from the conduit 13. The compartment 2 accordingly serves as a preliminary de-shaler to facilitate the actual separation of the coal from the middlings in compartment 3. As will be apparent, a separate bucket elevator, positioned adjacent the bucket elevator 10, can be provided for separate discharge of the middlings carried off through the conduit 13.

A discharge plate 14 is mounted at the top of the jig 1 adjacent the conduit 13 and is in communication with a chute 15. The clean coal is accordingly washed over the plate 14 and is carried off by the chute 15.

Positioned beneath the screens 4 and 4' are downwardly discharging air chambers 16 which communicate freely with liquid in the compartments 2 and 3 and extend across the width of the jig 1. A manifold pipe 17 carries compressed air or other fluid from a high pressure source (not shown) which is periodically admitted to the air chamber 16 via inlet valves 18 and branch pipes 19. In this way, the water in the air chambers 16 is displaced downwardly and flows upwardly through the screens 4, 4'. Quick opening of these inlet valves 18, combined with an arrangement which allows a large passage area, assures simultaneous lifting of the particles to be separated. Also, exhaust valves 20 are positioned in communication with the branch pipes 19.

Figure 2:
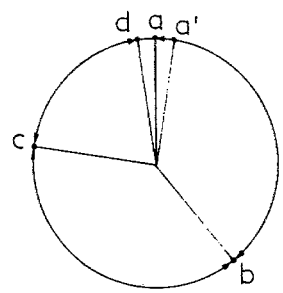
FIGURE 2 is a diagrammatic view of the air supply and discharge cycles in the jig.

Referring now to FIGURE 2, this pressure inlet period is indicated by arc $a$–$b$. The time required for the valves 18 to be moved from the closed position is indicated by arc $a$–$a'$, this being only a fraction of time $a$–$b$, so that upon opening the valve 18, the bed is abruptly lifted. Next, the inlet valves 18 are closed so that the liquid settles. First, particles of high specific gravity gravitate, followed by the particles of relatively low specific gravity. This separation is indicated by the arc $b$–$c$.

The height of the air chamber 16 is such as to prevent the air from escaping under the bottom discharge opening at the end of the upward jig stroke. The exhaust valves 20 are then opened. Due to the difference in height of the liquid levels in the compartments 2 and 3 and the air chamber 16, the liquid in these compartments flows downwardly, forcing the air in these chambers 16 out via branch pipes 19 and the exhaust pipes 21. This suction period is indicated by arc $c$–$d$.

However, the liquid must not enter these branch pipes 19 during this air exhaust period, as this would considerably increase the restriction to air flow during the pressure cycle. Accordingly, the exhaust valves 20 are closed before the liquid reaches the level of the branch pipes 19 in connection with the air chamber 16. In the upper portion of these air chambers 16, an air cushion is formed, preventing the liquid medium from flowing further. Immediately afterwards, the inlet valves 18 open in the arc $a$–$a'$, the air cushion compression stroke being indicated in FIGURE 2 by the arc $d$–$a$.

Figure 3:
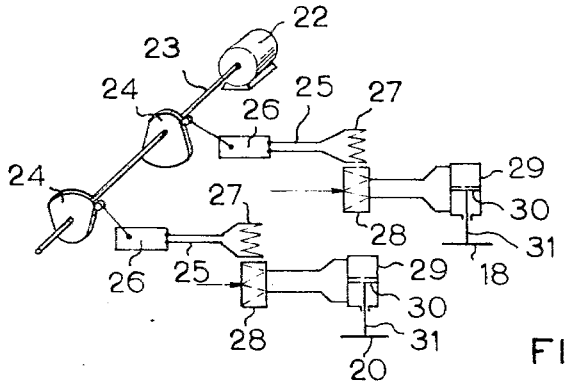
FIGURE 3 is a diagrammatic view of the air valve system.

Reference is now made to FIGURE 3 which shows diagrammatically the operation of the inlet valves 18 and the exhaust valves 20. There is provided an electric motor 22 driving the cam shaft 23. A cam 24 is mounted on the shaft, one for each valve. Microswitches 26 are positioned for operation by each of the cams 24, these switches 26 being incorporated in electric circuits 25. The circuits 25 also carry coils 27, which, on excitation, displace a distributing slide valve 28. Each valve 28 is operative to admit a pressure medium (not shown) e.g., compressed air to one side of a piston 30 movable in a cylinder 29. Joined to each piston 30 is a piston rod 31 each of which, in turn, carries a respective inlet valve 18 and exhaust valve 20.

The weight of the valve 18, piston 30 and piston rod 31 is very light so that the valves may be opened and closed very quickly. Disc valves are provided, seating against a flat seat of elastic material 32 (FIGURE 6), thereby insuring a large passage area immediately upon opening. By virtue of combination of electric and pneumatic operation, an almost frictionless operation is obtained, without lost motion.

Referring now to FIGURE 5, the cams 24 are shown to consist of two discs 33 and 34 positioned in abutting relationship and for relative rotation, one to the other. The discs 33 and 34 can be secured in any desired relative position with respect to each other by a bolt 35, and relative to the cam shaft 23 by bolt 36. The cyclical periods shown in FIGURE 2 determines the amplitude and course of the jig stroke, whereby it can be determined and set in advance. The frequency of the stroke can conveniently be adjusted to any desired value simply by providing the electric motor 22 with a continuous speed connecting means.

*Example 1*

A test plant, consisting of a trough of 0.4 by 1.5 meters, was loaded with nuts in the size grades I to III inclusive, containing 50% shale, to a bed-height of 400 mm. Through valves 18 of 150 mm. diameter, air with a pressure of 1600 mm. W.G. was supplied to an air chamber 16 under the screen 4 of the machine. The valves 18, 20 were operated by double-acting cylinders with a diameter of 1¾ inches and a stroke of 50 mm., piloted by electromagnetic four-way valves. The switches 26 in the circuits 25 for these valves were operated by adjustable cams 24 on a shaft 23 driven by a motor 22 which speed could be controlled continuously.

A continuous stream of material could not be handled by the apparatus. At various adjustments of the air-valves, it was determined after how many jig strokes a float with a given specific gravity took up the position in the jig bed corresponding to this specific gravity, after being pressed onto the screen deck.

It was found that the float took up the proper position after 2 or 3 jig strokes when the air valves were adjusted as follows: speed of the camshaft 50 r.p.m.; inlet 120°; expansion 85°; outlet 150°; compression 5°.

*Example 2*

A jig with a screen area of 3.6 sq. m. was loaded with 125 tons/hour in the nuts size grades I to V inclusive. Each compartment 2 and 3 had two air-chambers 16 whose surface area was equal to half of the screen surface area.

The air-valves and their operation were identical to those in Example 1, and the air-pressure was 1800 mm. W.G. The distance from the inlet valves 18 to the liquid level in the air-chamber, measured along the pipe, amounted to 3.5 m.

A quick and accurate separation was obtained with the air valves adjusted as follows: speed of the camshaft 52 r.p.m.; inlet 140°; expansion 140°; outlet 70°; compression 10°.

The admission valve is then open for $$\frac{140}{360} \times \frac{60}{52} \times 1{,}000 = 450 \text{ milliseconds}$$

The time required to move the valve from the closed position into the fully opened position was 18 milliseconds, with the light construction and the operation mechanism chosen for the air valve.

To produce a compression surge at a shock wave velocity of about 400 m./sec., the inlet valve 18 must be fully opened within a time $$t = \frac{3 \cdot 3500}{400} = 26 \text{ milliseconds}$$

which condition is amply satisfied.

From the foregoing description of the various embodiments of this invention, it is evident that the objects of this invention, together with many practical advantages are successfully achieved. While preferred embodiments of our invention have been described, numerous further modifications may be made without departing from the scope of this invention.

Therefore, it is to be understood that all matters herein set forth or shown in the accompanying drawings are to be interpreted in an illustrative, and not in a limiting sense.

What is claimed is:

1. In a process of separating particles of different specific gravity by passing a mixture of the particles to be separated over a screen and pulsing the mixture of particles in a separation liquid with a high pressure fluid such that the mixture is lifted up and particles of lower specific gravity rise to the top of the mixture, the improvement comprising the steps of:

(1) suddenly bringing the separation liquid into free communication with a source of high pressure fluid to produce a sufficient compression surge to force the separation liquid upwardly through the screen at a velocity wherein all particles are lifted substantially simultaneously;

(2) then blocking the communication between said separation liquid and high pressure source so that the separation liquid will flow in a subsequent downward direction, whereby the particles of high specific gravity drop to the screen first, followed by particles of lower specific gravity to form a layer of particles of high specific gravity on the screen with a layer of particles of lower specific gravity thereover; and (3) discharging the particles of high specific gravity from beneath the layer of particles of lower specific gravity.

2. Method according to claim 1 including the step of bringing the separation liquid into full communication with the high pressure source within a time $$T = \frac{3L}{V}$$

where L is the distance in meters that the high pressure fluid travels from the sudden free communication to the blocking and V is the velocity of propagation in m./sec. of a shock wave produced by the sudden free communication.

3. Method defined in claim 2 where T is a maximum of 50 milliseconds.

4. Apparatus for separating particles of different specific gravity comprising:

(1) a jig, and a separation liquid therein;

(2) screen means positioned across the upper end of said jig;

(3) a high pressure fluid source;

(4) means providing downwardly facing air chambers in said jig in communication with said high pressure source, said air chambers being located directly below said screen means and said air chambers being in direct communication with the separation liquid;

(5) inlet and exhaust valve means operatively positioned between said air chamber means and said high pressure source for cyclically introducing a sudden compressive surge in said air chamber means under said screen means, said valve means including:
  (a) a piston, piston rod and cylinder assembly,
  (b) a flat-seated valve head joined to said piston rod;
(6) distributing means for supplying high pressure fluid to said cylinder to control said valve means; and
(7) a cam shaft and cam means mounted on said shaft, operatively associated with said distributing means to control the latter.

5. Apparatus defined in claim 4 wherein said distributing means includes an electrical circuit having a coil therein, and a switch in said circuit positioned for actuation by said cam means to control energization of said coil.

6. Apparatus defined in claim 4 wherein said cam means is adjustable.

7. Apparatus according to claim 6 wherein said cam means include two discs operatively mounted adjacent one another and adjustable by relative rotation therebetween.

8. Apparatus according to claim 4 including means for continuously controlling the rotational speed of said cam shaft.

9. Apparatus according to claim 4 wherein said air chamber means includes a plurality of spaced apart air chambers and said valve means including separate inlet and exhaust valves for each of said air chambers.

10. Apparatus for separating particles of different specific gravity comprising feed means for supplying material to be separated to a jig means, said jig means having a plurality of upper compartments for receiving material to be separated and having foraminous screen means for supportably retaining material to be separated in a plurality of layers of different specific gravity, said material to be separated containing particles of high, medium and lower specific gravity, a plurality of lower compartments containing a separation liquid and downwardly discharging high pressure fluid outlets in said lower compartments for compacting and raising the material to be separated by means of a high pressure fluid and for pulsating said separation liquid in said lower compartments by means of said high pressure fluid to raise the level of the material to be separated, valve means and control means for intermittently supplying high pressure fluid to said high pressure fluid outlets and exhaust means associated with said high pressure fluid outlets for withdrawing said high pressure fluid, bridge means for connecting said upper compartments and movable discharge means for discharging material of high and medium specific gravity from said upper compartments, said high pressure fluid outlets permitting said high pressure fluid to displace a portion of said separation liquid in said lower compartments, thereby causing said separation liquid to rise from said lower compartments through said foraminous screen means to substantially simultaneously lift said material to be separated above said foraminous screen means, said high pressure fluid outlets permitting said separation liquid in said lower compartments to displace said high pressure fluid in said high pressure fluid outlets and thereby permit said material to be separated to be lowered to said foraminous screen means and thereby bring about a separation of said material to be separated into a lower layer of high specific gravity particles and an upper layer containing a mixture of medium and lower specific gravity particles in one of said upper compartments adjacent said feed means, the movable discharge means in said upper compartment adjacent said feed means permitting said lower layer of high specific gravity particles to be discharged from such upper compartment, said mixture of medium and lower specific gravity particles passing over said bridge means into a second upper compartment wherein high pressure fluid outlets and valve means and control means effect a separation of said mixture into a lower layer containing medium specific gravity particles and an upper layer containing lower specific gravity particles, the movable discharge means in said second upper compartment containing said mixture permitting said medium specific gravity particles to be discharged therefrom, and means for discharging said lower specific gravity particles from the upper layer in said second upper compartment.

11. Apparatus according to claim 10 wherein the discharge means for both the high and medium specific gravity particles lead to discharge means in said lower compartments.

12. Method of separating particles of different specific gravity comprising the steps of feeding a material to be separated containing particles of high, medium and lower specific gravity to a compartment, compacting the material to be separated and then raising the material to be separated a short distance by means of a high pressure fluid shock wave, then substantially simultaneously raising the level of said material to be separated in said compartment by means of a separation liquid, controlling the movement of said separation liquid by displacing the same with the high pressure fluid and then permitting the separation liquid to displace the high pressure fluid to lower the level of said material to be separated in said compartment and thereby separate said material to be separated into a lower layer containing particles of high specific gravity and an upper layer containing a mixture of particles of medium and lower specific gravity, permitting the particles of high specific gravity to be discharged from the lower layer in said compartment and permitting said mixture in said upper layer to be discharged into a second compartment, raising the level of said mixture in said second compartment by means of the separation liquid, controlling the movement of the separation liquid by displacement thereof with the high pressure fluid and subsequently displacing the high pressure fluid with the separation liquid to thereby separate said mixture into a lower layer of medium specific gravity particles and an upper layer of lower specific gravity particles, permitting the particles of medium specific gravity to be discharged from the lower layer in said second compartment and recovering said lower specific gravity particles from the upper layer of said second compartment.

13. Method according to claim 12 including the steps of first compacting the mixture in said second compartment and then raising the mixture a short distance by means of a high pressure fluid shock wave, and then substantially simultaneously raising the level of the mixture by means of the separation liquid.

References Cited by the Examiner

UNITED STATES PATENTS

| | | | |
|---|---|---|---|
| 236,730 | 1/1881 | Stephens | 209—475 |
| 2,052,431 | 8/1936 | Wade | 209—455 |
| 2,132,754 | 10/1938 | Nichols | 209—500 |
| 2,314,428 | 3/1943 | Schouten | 209—500 X |
| 2,606,661 | 8/1952 | Lotz | 209—457 X |
| 2,609,098 | 9/1952 | Lotz | 209—457 |
| 2,846,071 | 8/1958 | Richards | 209—455 |
| 2,847,125 | 8/1958 | Belliard | 209—455 |
| 2,889,045 | 6/1959 | Turpin | 209—491 |

FRANK W. LUTTER, *Primary Examiner.*

ROBERT A. O'LEARY, HARRY B. THORNTON,
*Examiners.*

H. F. PEPPER, *Assistant Examiner.*